(12) United States Patent
Nishita (10) Patent No.: US 6,527,459 B2
(45) Date of Patent: Mar. 4, 2003

(54) OPTICAL CONNECTOR

(75) Inventor: Naoki Nishita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/032,337

(22) Filed: Dec. 19, 2001

(65) Prior Publication Data

US 2002/0106167 A1 Aug. 8, 2002

Related U.S. Application Data

(63) Continuation of application No. PCT/JP01/08386, filed on Sep. 26, 2001.

(30) Foreign Application Priority Data

Sep. 27, 2000 (JP) ........................................ 2000-294252

(51) Int. Cl.[7] ................................................ G02B 6/36
(52) U.S. Cl. .............................. 385/92; 385/88; 385/89
(58) Field of Search ............................... 385/88, 89, 92

(56) References Cited

U.S. PATENT DOCUMENTS 6,341,898 B1 * 1/2002 Matsushita ................... 385/88

FOREIGN PATENT DOCUMENTS

| JP | 04-342973 | 11/1992 |
| JP | 05-224092 | 9/1993 |
| JP | 07-183067 | 7/1995 |
| JP | 2514458 | 7/1996 |
| JP | 2516511 | 8/1996 |
| JP | 2001-257032 | 9/2001 |

OTHER PUBLICATIONS

International Search Report for PCT Application No. PCT/JP01/08386, having a date of mailing of Dec. 6, 2001.

* cited by examiner

*Primary Examiner*—Rodney Bovernick
*Assistant Examiner*—Sung Pak
(74) *Attorney, Agent, or Firm*—Knobbe, Martens, Olson & Bear LLP (57) ABSTRACT

An optical connector of the invention is a small-sized optical connector capable of connecting an optical fiber to an optical device with a low connection loss. An optical connector (2) has a plug housing (housing) (6). At the back end side of an upper face (7) of the housing (6), bridge supporting parts (8) standing from both sides of the upper face of the housing and a bridge part (9) spaced from the upper face of the housing (6) as supported at both sides thereof by the bridge supporting parts (8) are disposed. The center part of the bridge part (9) is formed with a lock arm (5) extended toward the front end (20) side of the housing (6). The front end side of the lock arm (5) is formed with a locking pawl (4) extended upward for locking into a pawl fitting hole (11) of an adapter (1) in inserting and fitting the optical connector (2) to the adapter (1). When the optical connector (2) is removed from the adapter (1), the center part of bridge part (9) is pushed from the upper side to elastically deform the bridge part (9), the locking pawl (4) is moved downward and is removed from the pawl fitting hole (11), and the optical connector (2) is pulled out.

2 Claims, 7 Drawing Sheets

OPTICAL CONNECTOR

This application claims priority under 35 U.S.C. Sections 120 and 365 to International Application No. PCT/JP01/08386, filed on Sep. 26, 2001, which published in the Japanese language as International Publication No. WO 02/27375 A1 on Apr. 4, 2002. The disclosure of the international application is hereby incorporated by reference in its entirety.

TECHNICAL FIELD

The present invention relates to an optical connector for use in optical communications. The optical connector of the invention is mounted in a vehicle for use in optical communications inside the vehicle, or is used in optical communications such as an FA (Factory Automation), a home LAN (Local Area Network), an audio and a PC (Personal Computer), for example.

BACKGROUND OF THE INVENTION

Recently, the computerization of vehicles has been developing dramatically. For example, displaying a vehicle location on a map using a car navigation system and management for solving traffic congestion or the like utilizing the ITS (Intelligent Transport Systems) are conducted. With such computerization, communication information throughput such as data, image and voice in vehicles has been increasing. As high-capacity information transmitting media, optical fibers have been used.

When information is transmitted by using the optical fiber, at the present moment, a transmitted signal is converted from an electric signal to a light signal by an E/O (electric/optical) conversion device and the light signal is transmitted to the receiving side through the optical fiber. On the receiving side, the light signal transmitted through the optical fiber is converted to an electric signal by an O/E (light/electric) conversion device for extraction. By this electric signal, a desired signal processing such as control is applied.

Accordingly, when information transmission is conducted by using the optical fiber, it is needed that the E/O conversion device is connected to a transmitting optical fiber and an optical fiber where light signals are transmitted is connected to the O/E conversion device. As one example of a method for connecting an optical fiber to an optical device such as an E/O conversion device or O/E conversion device, a connecting method using an optical connector is proposed.

Figure 7A:
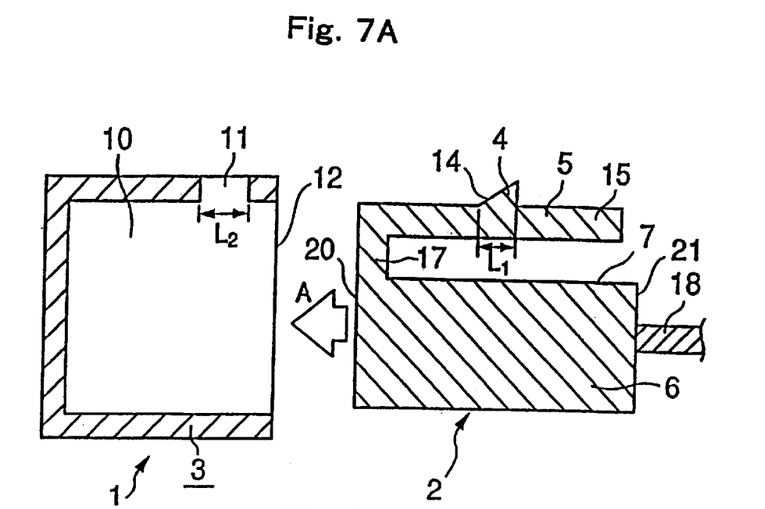
FIG. 7A depicts a sectional illustration showing a state before connection in one example of a traditionally proposed method for connecting an optical connector to an adapter.
Figure 7B:
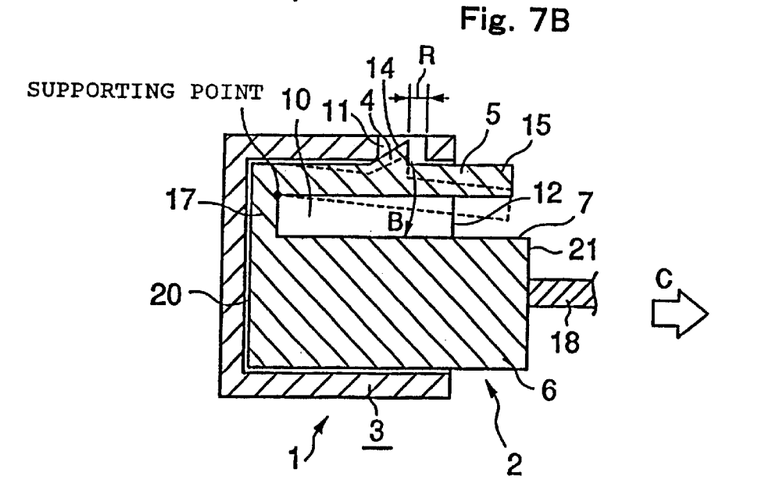
FIG. 7B depicts a sectional illustration showing a state after the optical connector is connected to the adapter shown in FIG. 7A.

FIGS. 7A and 7B schematically depict sections illustrating one example of the method for connecting an optical fiber to an optical device using the aforesaid optical connector. The connecting method shown in these drawings is a connecting method where a connector (plug connector) 2 is detachably connected to an adaptor (receptacle connector) 1. To the adaptor 1, an optical device such as an E/O conversion device or O/E conversion device (not shown) is connected. To the optical connector 2, an optical fiber 18 is fixed.

As shown in FIGS. 7A and 7B, the adaptor 1 has a box-like receptacle housing 3 having a connector insertion part 10. An end part opening of the connector insertion part 10 is formed to be an insertion opening 12 for the optical connector. The top of the connector insertion part 10 is formed with a pawl fitting hole 11 as a locking part for the optical connector. Additionally, to the opposite side of the insertion opening 12 for the optical connector, an optical device such as an E/O conversion device or O/E conversion device, not shown, is connected.

On one hand, the optical connector 2 has a box-like plug housing 6. To an optical fiber fixing part (not shown) formed in the plug housing 6, the connection end face side of the optical fiber 18 is inserted and fixed. The upper face 7 side of the plug housing 6 is formed with an arm supporting part 17 standing from the front end 20 side of the plug housing 6 upward. A lock arm 5 is formed to extend from the arm supporting part 17 to the back end 21 side of the plug housing 6.

The lock arm 5 is spaced from an upper face 7 of the plug housing 6. The lock arm 5 is formed with a locking pawl 4 for fitting in the pawl fitting hole 11 of the adapter 1, the locking pawl 4 is formed to extend upward. The locking pawl 4 has a slope 14 that is formed to be higher as it goes to the back end side.

When the optical connector 2 is moved in the direction of an arrow A in FIG. 7A and is inserted into the optical connector insertion part 10 of the adapter 1, the locking pawl 4 of the optical connector 2 is fit in the pawl fitting hole 11 of the adapter 1, as shown in FIG. 7B. By this fitting, the optical connector 2 is in a state that it is prevented from falling off from the adapter 1. Additionally, the back end 21 side of the plug housing 6 and the end side 15 of the lock arm 5 are in a state of extending from the connector insertion opening 12 of the adapter 1.

Then, as shown in broken lines shown in FIG. 7B, when the end side 15 of the lock arm 5 is drawn to the upper face 7 side of the plug housing 6, the lock arm 5 comes close to the upper face 7 of the plug housing 6 as the base end thereof is used as a supporting point. Then, the locking pawl 4 is moved to the plug housing 6 side through a track indicated by an arrow B. This movement unlocks the locking pawl 4 from the pawl fitting hole 11 of the adapter 1. Then, when the optical connector 2 is pulled in the direction of an arrow C in this state, the optical connector 2 is removed from the adapter 1.

Furthermore, in the configuration shown in FIGS. 7A and 7B, the track of the locking pawl 4 indicated by the arrow B needs to be ensured when the end side 15 of the lock arm 5 is drawn to the upper face 7 side of the plug housing 6. That is, in the configuration described above, it is necessary to prevent the back end side of the locking pawl 4 from being caught by the wall surface of the pawl fitting hole 11. To this end, a length $L_2$ of the pawl fitting hole 11 shown in FIG. 7A is formed longer than a length $L_1$ of the locking pawl 4. By this length setting, when the optical connector 2 is fit to the adapter 1, a space R about 0.3 mm, for example, is formed between the pawl fitting hole 11 and the back end part of the locking pawl 4, as shown in FIG. 7B.

Meanwhile, the connection accuracy of the optical fiber 18 to the optical device using the above-described optical connector 2 is determined by a relative position of the optical connector 2 and the adapter 2 in the state of the optical connector 2 being fit to the adapter 1.

However, in the configuration shown in FIGS. 7A and 7B, when the optical connector 2 is fit to the adapter 1, the space R is formed between the pawl fitting hole 11 and the back end part of the locking pawl 4 and a play by the amount of the space R is generated. On this account, the connection of the optical fiber 18 to the optical device using the aforementioned connecting method has had a problem that generates a connection loss of the optical fiber 18 to the optical device due to the play by the amount of the space R.

Then, in order to solve this problem, a method has been proposed that the optical fiber 18 is connected to the optical device by connecting an optical connector 2 having a configuration different from the aforesaid optical connector 2 to the adapter 1. The optical connector 2 in the proposal has a configuration shown in FIGS. 8A and 8B. As shown in these drawings, the configuration of the adapter 1 connected to the optical connecter 2 is the same as FIGS. 7A and 7B and thus the description thereof is omitted.

Figure 8A:
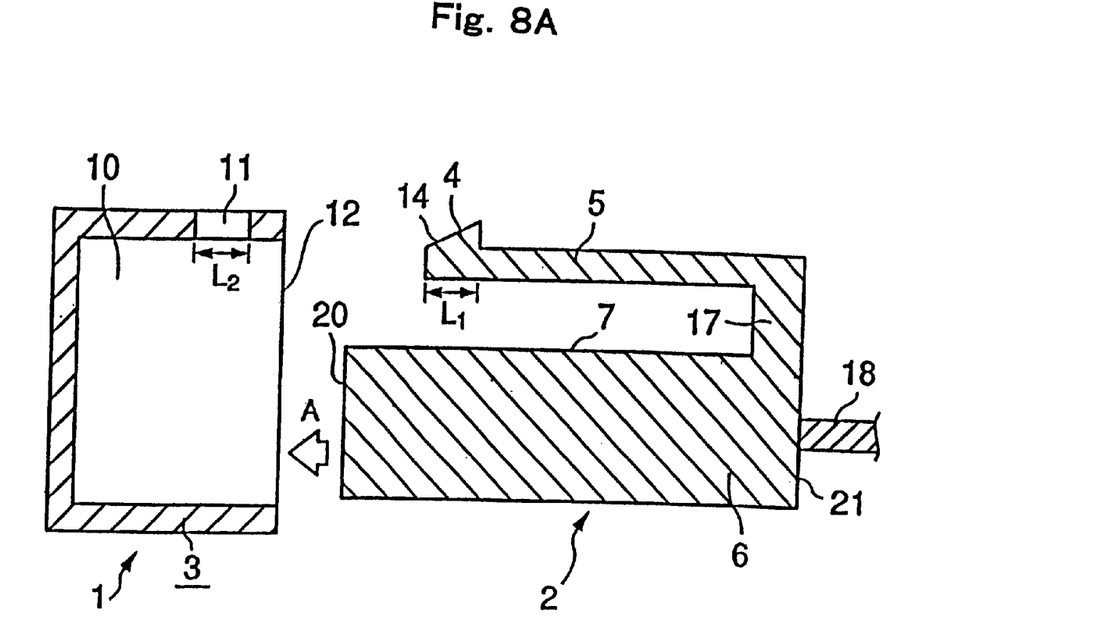
FIG. 8A depicts a sectional illustration showing a state before connection in another example of a traditionally proposed method for connecting an optical connector to an adapter.
Figure 8B:
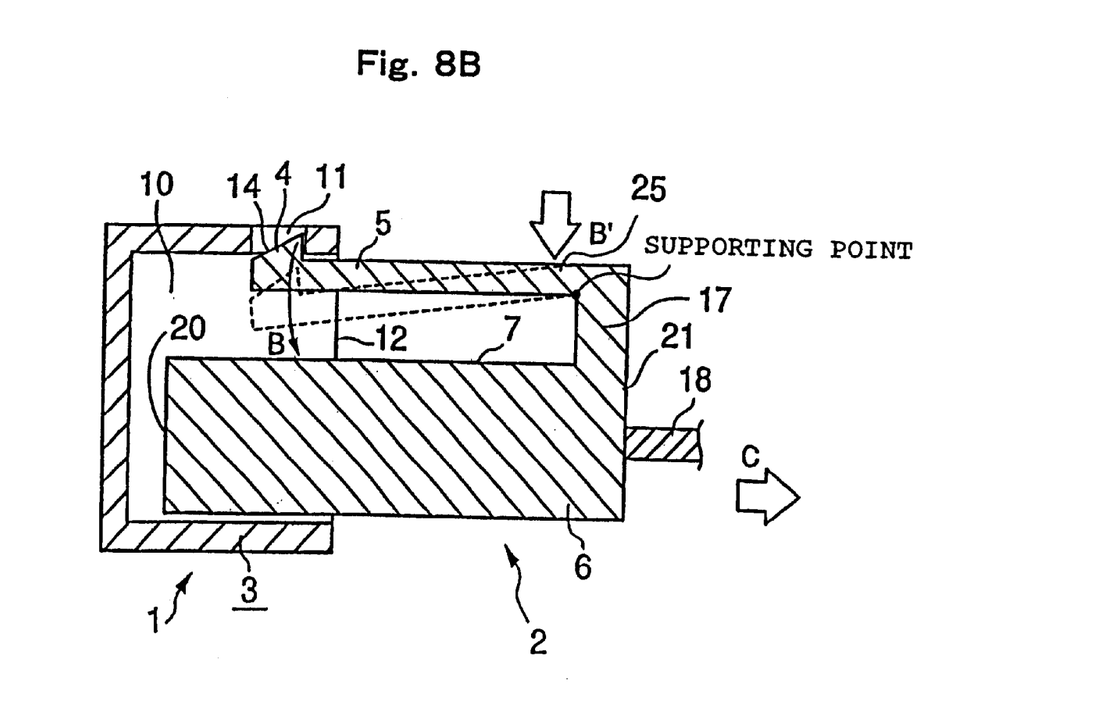
FIG. 8B depicts a sectional illustration showing a state after the optical connector is connected to the adapter shown in FIG. 8A.

The optical connecter 2 shown in FIGS. 8A and 8B has a plug housing 6 where an optical fiber 18 is inserted and fit as similar to the optical connector 2 shown in FIGS. 7A and 7B. However, an upper face 7 of the plug housing 6 is formed with an arm supporting part 17 standing from the back end 21 side thereof to the upper side. A lock arm 5 is formed to extend from the arm supporting part 17 toward the front end 20 side of the plug housing 6. The lock arm 5 is spaced from the upper face 7 of the plug housing 6. At the front end of the lock arm 5, a locking pawl 4 is formed as similar to the optical connector 2 shown in FIGS. 7A and 7B.

Fitting the proposed optical connector 2 to an adapter 1 is conducted by the movement of the optical connector 2 in the direction of an arrow A, as shown in FIG. 8A. By this movement, insertion and fitting to a connecter insertion part 10 and fitting the locking pawl 4 of the optical connector 2 to a pawl fitting hole 11, as shown in FIG. 8B, are conducted.

On the other hand, when the optical connector 2 is removed from the adapter 1, it is conducted by pushing a base end side 25 of the lock arm 5 toward the upper face 7 side of the plug housing 6, as indicated by an arrow B' shown in FIG. 8B. By this operation, the lock arm 5 is brought close to the upper face 7 side of the plug housing 6 as the base end part is used as a supporting point, as indicated by broken lines shown in the drawing. Then, the locking pawl 4 is moved to the plug housing 6 side through the track indicated by an arrow B and is removed from the pawl fitting hole 11 of the adapter 1. When the optical connector 2 is pulled in the direction of an arrow in this state, the optical connector 2 is removed from the adapter 1.

In FIGS. 8A and 8B, when the base end side 25 of the lock arm 5 is pushed toward the upper face 7 side of the plug housing 6, the locking pawl 4 of the optical connector 2 is moved through the track indicated by the arrow B shown in FIG. 8B. On this account, the locking pawl 4 is not caught by the inner wall of the pawl fitting hole 11. Thus, in the configuration shown in FIGS. 8A and 8B, a length $L_1$ of the locking pawl 4 and a length $L_2$ of the pawl fitting hole 11 are formed to be almost equal.

Accordingly, the configuration shown in FIGS. 8A and 8B can solve the problem due to the play by the amount of the space R between the locking pawl 4 and the pawl fitting hole 11 in fitting the optical connector 2 to the adapter 1 as shown in FIGS. 7A and 7B.

However, in the optical connector 2 shown in FIGS. 8A and 8B, when the optical connector 2 is removed from the adapter 1, the base end side 25 of the lock arm 5 is pushed toward the upper face 7 side of the plug housing 6 and the locking pawl 4 is removed from the pawl fitting hole 11. Then, the length of the lock arm 5 needs to be longer so that the base end side 25 of the lock arm 5 is pushed by a human finger, for example, to tilt the lock arm 5. Accordingly, in the configuration shown in FIGS. 8A and 8B, a problem has arisen that the plug housing 6 of the optical connector 2 needs to be formed longer, which causes an increase of the optical connector 2 in size.

DISCLOSURE OF THE INVENTION

An optical connector of the invention comprising:
a housing;
bridge supporting parts disposed at a back end side of an upper face of the housing and standing from both sides of the upper face of the housing;
a bridge part spaced from the upper face of the housing as supported at both sides thereof by the bridge supporting parts;
a lock arm formed in a midway part of the bridge part and extended toward a front end side of the housing;
a locking pawl extended upward at a position of a front end side of the lock arm for locking into a locking part of a connecting counter part side in inserting and fitting the optical connector to the connecting counter part side.

Additionally, in one embodiment of the invention, the front end side of the lock arm is extended longer than a locking pawl forming part and the front end thereof is fixed to the upper face of the housing.

In the invention of the aforesaid configuration, in the midway part of the bridge part formed on the back end side of the upper face of the housing, the lock arm having the locking pawl on the front end side thereof is formed to extend toward the front end side of the housing. On this account, when the optical connector is inserted into the connecting counter part side from the front end side thereof, the aforesaid locking pawl locks into the locking part of the connecting counter part side in inserting and fitting the optical connector to be a state of preventing falling off.

Additionally, the aforesaid bridge part is spaced from the upper face of the housing as supported at both end sides thereof by the bridge supporting parts standing from both sides of the upper face of the housing. On this account, when the midway part of the bridge part is pushed from the upper side, the bridge part is elastically deformed as the bridge supporting parts are used as supporting points and the midway part of the bridge part comes close to the upper face of the housing. Then, the aforesaid lock arm comes close to the upper face of the housing along with the bridge part and the locking pawl formed at the front end side of the lock arm is removed from the locking part of the connecting counterpart side. When the housing is pulled toward the back end side in this state, the optical connector is removed from the connecting counter part side.

That is, the invention is the configuration where the locking pawl at the lock arm front end side is brought close to the upper face of the housing, using the bridge supporting parts standing from the both sides of the upper face of the housing on the back end side of the housing as the supporting points. Therefore, even though the width of the bridge part (a length in the direction of inserting the optical connector) is short, the locking pawl can be brought close to the upper face of the housing, and the length of the lock arm or housing does not need to be formed longer in the direction of inserting the optical connector. Thus, a small-sized optical connector can be realized.

Furthermore, in the invention, the lock arm is brought close to the upper face of the housing using the bridge supporting parts at the back end side of the housing as the supporting points. Therefore, it is not necessary to form a space between the locking pawl and the locking part (a hole for fitting the lick pawl, for example) of the connecting counter part side. Accordingly, it can be prevented that the space creates a play to generate a connection loss between the optical device and the optical fiber to be inserted into the optical connector.

Moreover, the optical connector where the front end side of the lock arm is extended longer than the locking pawl forming part and the front end thereof is fixed to the upper face of the housing can realize an optical connector having higher reliability. The reason is that the optical fiber inserted into the optical connector or electrical wiring disposed around the optical connector can be prevented from entering the under side of the lock arm in the optical connector having the configuration.

BEST MODE FOR CARRYING OUT THE INVENTION

In order to describe the invention in more detail, it will be described in accordance with the embodiments with reference to the accompanying drawings. Additionally, in the description of each of the embodiments, the parts having the same designation as the orthodox examples are designated the same numerals and signs, omitting or simplifying the overlapping description.

Figure 1:
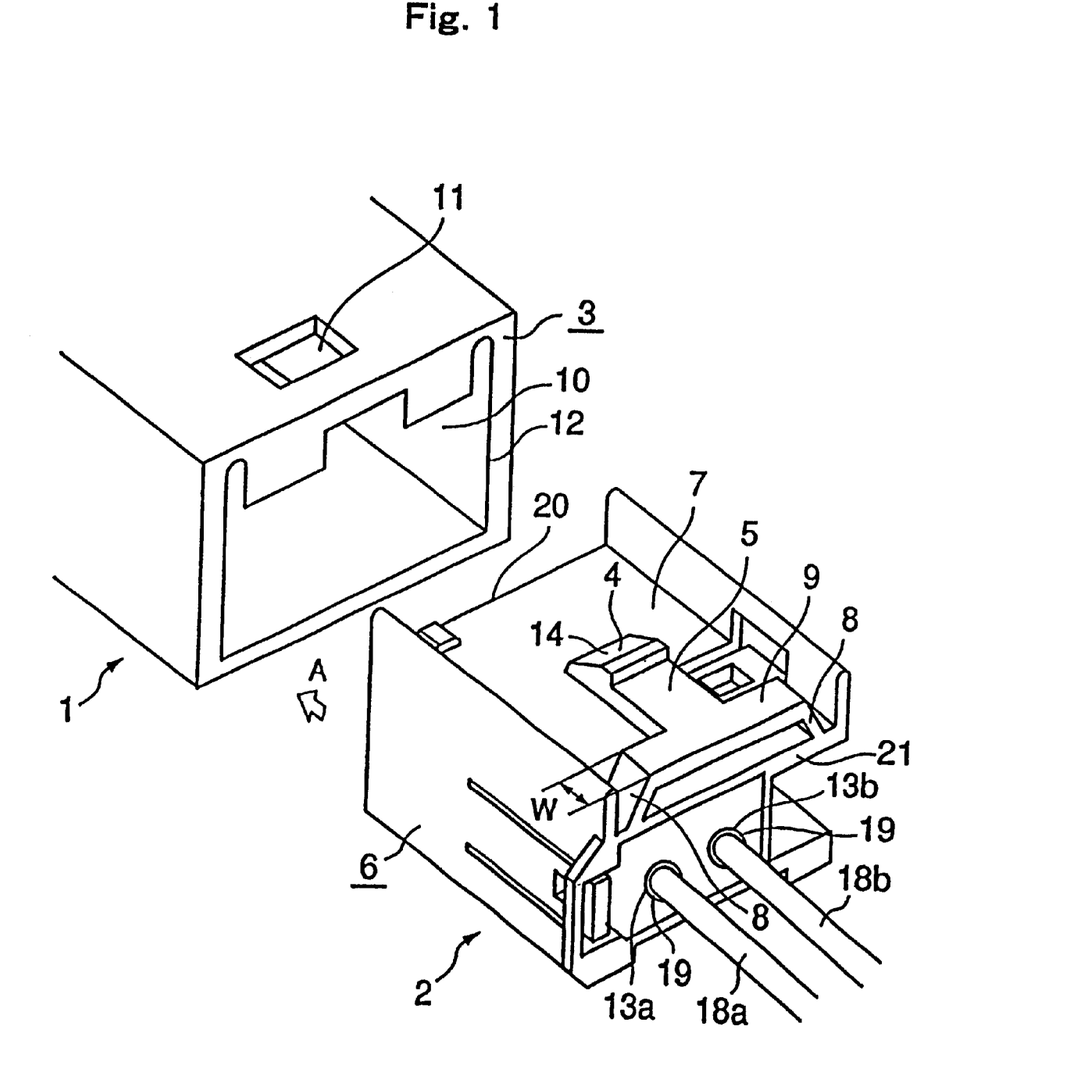
FIG. 1 depicts a configurational view of a principle part illustrating a first embodiment of the optical connector in the invention along with an adapter to be a connecting counter part side.
Figure 2A:
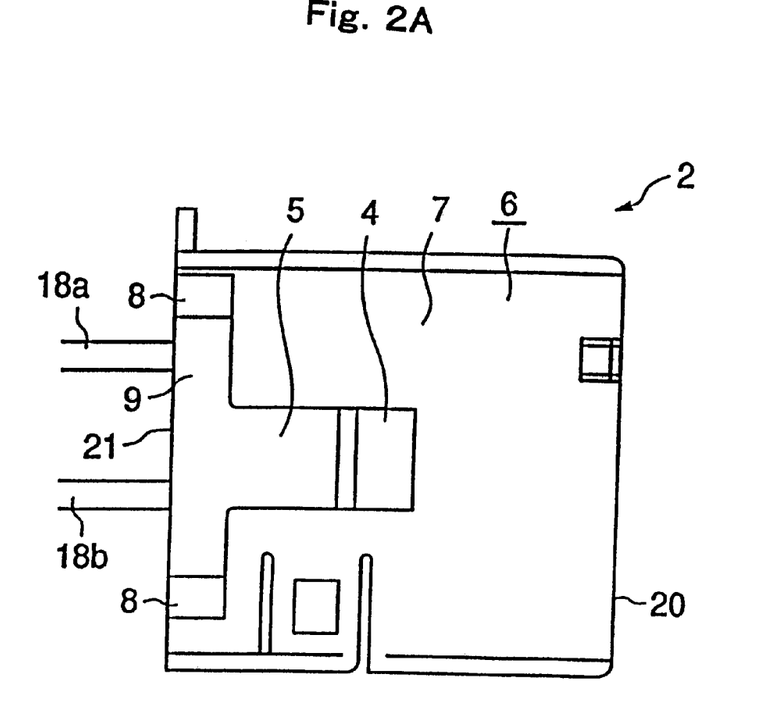
FIG. 2A depicts a plan view illustrating the optical connector of the first embodiment.
Figure 2B:
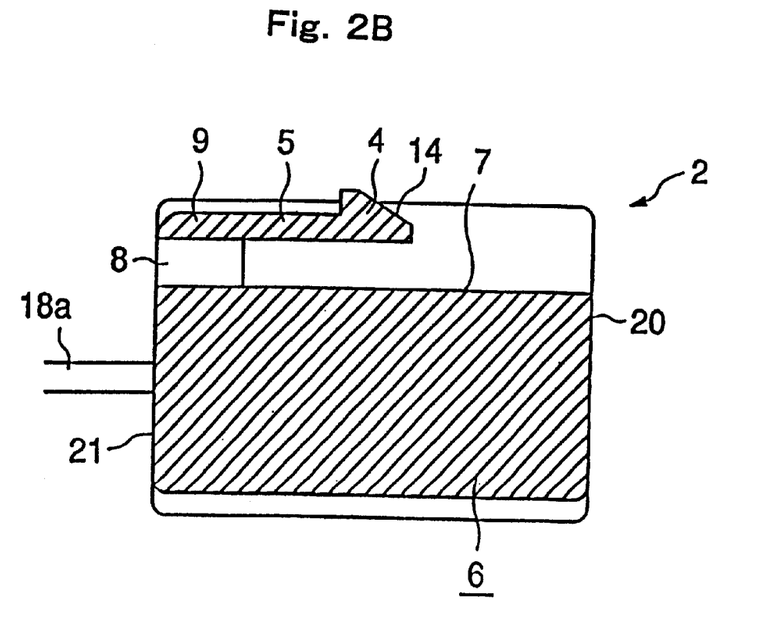
FIG. 2B depicts a section illustrating the optical connector of the first embodiment.

FIG. 1 depicts a perspective view illustrating a first embodiment of the optical connector in the invention along with an adapter to be a connecting counter part side. In addition, FIG. 2A depicts a plan view illustrating the optical connector of the first embodiment and FIG. 2B depicts a section illustrating the optical connector of the first embodiment.

As shown in these drawings, the optical connector (plug connector) 2 of the first embodiment has a plug housing 6 as a housing. At the back end side of an upper face 7 of the plug housing 6, bridge supporting parts 8 standing from both sides of the upper face 7 of the plug housing 6 are disposed. Additionally, the back end side of the upper face 7 of the plug housing 6 is formed with a bridge part 9 that is spaced from the upper face 7 of the plug housing 6 and is supported at both sides thereof by the bridge supporting parts 8.

The longitudinal direction of the bridge part 9 is formed almost orthogonal to the direction of inserting the optical connector 2. A midway part (a center part here) of the bridge part 9 is formed with a lock arm 5 extending toward the front end 20 side of the plug housing 6. The front end side of the lock arm 5 is formed with a locking pawl 4 extending upward for locking into the locking part of the connecting counter part side in inserting and fitting the optical connector 2 into the connecting counter part side.

Furthermore, in the first embodiment, the connecting counter part side is an adapter 1. The adapter 1 has a receptacle housing 3 with a connector insertion part 10 as similar to the orthodox examples. The receptacle housing 3 is formed with a pawl fitting hole 11 as a locking part. Moreover, to the adapter 1, an E/O conversion device and an O/E conversion device, not shown, are connected on the opposite side of an insertion part 12 for the optical connector 2.

Materials for the optical connector of the invention are not defined particularly, which are set properly. However, the optical connector 2 of the first embodiment is formed by shaping a PBT (polybutylene terephthalate). The plug housing 6 is formed with insertion parts 13a and 13b for optical fibers. To the insertion parts 13a and 13b, optical fibers (plastic optical fibers) 18a and 18b fixed to ferrules 19, for example, are inserted and fixed.

The first embodiment is configured as described above. As indicated by an arrow A shown in FIG. 1, the optical connector 2 is inserted into the connector insertion part 10 of the adapter 1. Then, the locking pawl 4 at the front end side of the lock arm 5 locks into the pawl fitting hole 11 as the locking part of the adapter 1 and is in a state of preventing falling off. Then, the E/O conversion device and the O/E conversion device connected to the adapter 1 are optically coupled to the optical fibers 18a and 18b in the optical connector 2.

Figure 3:
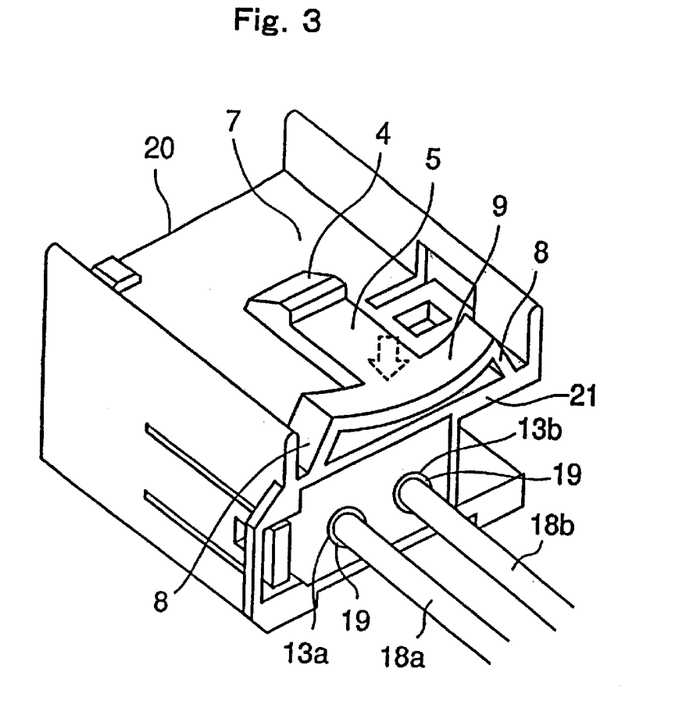
FIG. 3 depicts an illustration showing the operation of the optical connector of the first embodiment by a perspective view.

In addition, in the optical connector 2 of the first embodiment, the aforesaid bridge part 9 is formed to have a space from the upper face 7 of the plug housing 6 as it is supported at both sides thereof by the bridge supporting parts 8 standing from the both sides of the upper face 7 of the plug housing 6. On this account, as shown in FIG. 3, when the center part of the bridge part 9 is pushed from the upper side, the bridge part 9 is elastically deformed using the bridge supporting parts 8 as supporting points and the center part of the bridge part 9 comes close to the upper face 7 of the plug housing 6.

Figure 4:
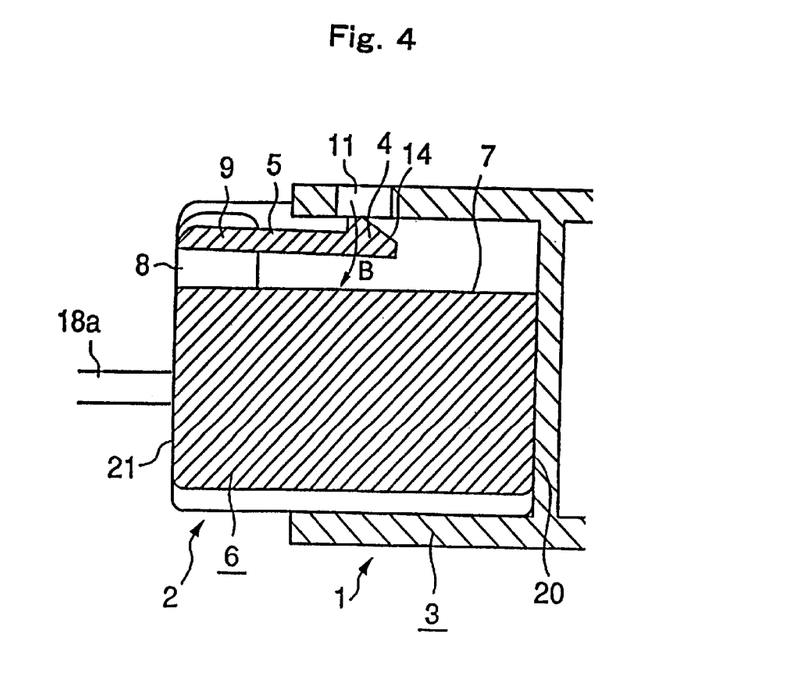
FIG. 4 depicts an illustration showing the operation of the optical connector of the aforesaid embodiment by a section along with the adapter to be the connecting counter part side.

Then, the lock arm 5 comes close to the upper face 7 of the plug housing 6 along with the bridge part 9. Then, as shown in FIG. 4, the locking pawl 4 formed at the front end side of the lock arm 5 is coming close to the upper face 7 side of the plug housing 6 through a track indicated by an arrow B. Then, the locking pawl 4 is removed from the pawl fitting hole 11 of the adapter 1. When the plug housing 6 is pulled to the back end 21 side in this state, the optical connector 2 is removed from the adapter 1. Accordingly, the optical coupling of the E/O conversion device and the O/E conversion device to the optical fibers 18a and 18b is released.

As described above, the optical connector 2 of the first embodiment has the configuration where the locking pawl 4 at the front end side of the lock arm 5 is brought close to the upper face 7 of the plug housing 6 using the bridge supporting parts 8 standing from the both sides of the upper face of the housing on the back end 21 side of the plug housing 6 as the supporting points and the locking pawl 4 is removed from the pawl fitting hole 11. Therefore, the optical connector 2 of the first embodiment allows the locking pawl 4 to come close to the upper face of the housing even though a width W of the bridge part 9 is short. That is, in the optical connector 2 of the first embodiment, the length of the lock arm 5 or plug housing 6 does not need to be formed longer in the direction of inserting the optical connector 2. Accordingly, the optical connector 2 of the first embodiment is formed to be a small-sized optical connector 2.

Furthermore, in the optical connector 2 of the first embodiment, the locking pawl 4 comes close to the upper face 7 of the plug housing 6 through the track indicated by the arrow B shown in FIG. 4. Therefore, in connecting the optical connector 2 of the first embodiment to the adapter 1, a space does not need to be formed between the locking pawl 4 and the pawl fitting hole 11 and a play due to the space is not generated. Accordingly, the optical connector 2 of the first embodiment is connected to the adapter 1 and thereby the optical fibers 18a and 18b can be connected to the optical devices with a low connection loss.

Figure 5A:
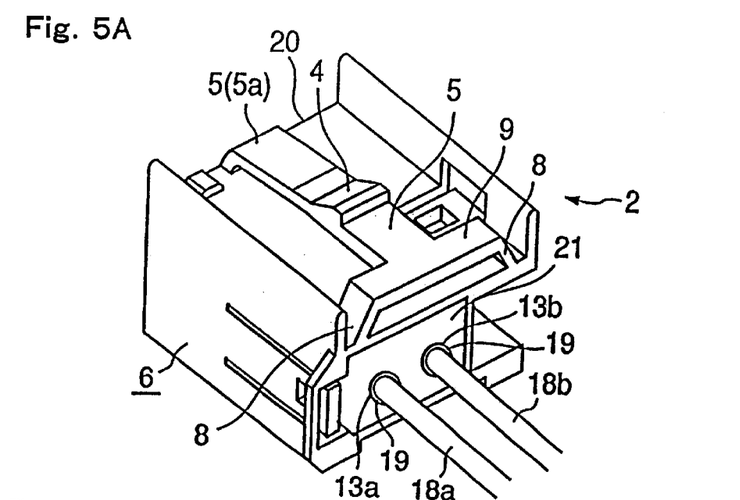
FIG. 5A depicts a perspective view of a second embodiment of the optical connector in the invention.
Figure 5B:
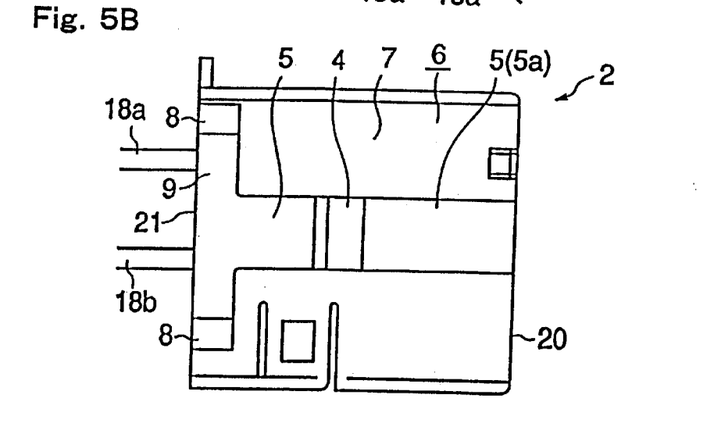
FIG. 5B depicts a plan view of the optical connector of the second embodiment.
Figure 5C:
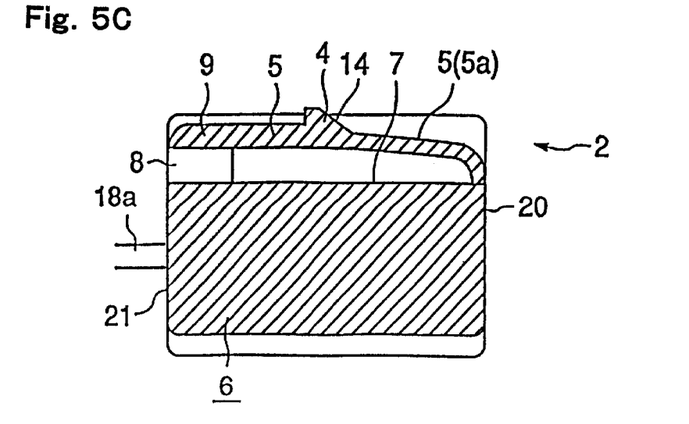
FIG. 5C depicts a section of the optical connector of the second embodiment.

FIGS. 5A, 5B and 5C depict a perspective view, a plan view and a section illustrating a second embodiment of the optical connector 2 in the invention, respectively. Additionally, in the description of the second embodiment, the parts having the same designation as the first embodiment are designated the same numerals and signs, omitting or simplifying the overlapping description.

The second embodiment is configured almost the same as the first embodiment described above. Features that the second embodiment is different from the first embodiment are in that the front end side of a lock arm 5 is extended longer than a forming part of a locking pawl 4 and the front end thereof is fixed to an upper face 7 of a plug housing 6.

In the second embodiment, the lock arm 5 extended longer than the forming part of the locking pawl 4 is a protection part 5a having a gentle slope. The protection part 5a has a function of preventing optical fibers 18a and 18b or electric wiring (not shown) from entering the under side of the lock arm 5.

In addition, in the case of the optical connector 2 having a configuration where the lock arm 5 is spaced from the upper face 7 of the plug housing 6, a following contrivance is needed. That is, in order to prevent the front end side of the lock arm 5 from tilting lower than a designed position in the fabrication process of the optical connector 2, the contrivance is needed that the front end side of the lock arm 5 is formed upward by the amount of the tilt. However, when the protection part 5a is formed at the front end side of the lock arm 5 as the second embodiment, the lock arm 5 can be formed at the designed position without providing the contrivance as described above.

The second embodiment is configured as described above. The second embodiment can also exert the same effect by the operation similar to the first embodiment.

Furthermore, in the second embodiment, the optical connector 2 is easily fabricated by disposing the protection part 5a. Moreover, the second embodiment can surely prevent the optical fibers 18a and 18b, electric wiring or the like from entering the under side of the lock arm 5.

Besides, the invention is not limited to each of the embodiments, which can adapt various embodiments. For example, in the first embodiment, wall parts may be erected at both sides of the lock arm 5 to suppress the optical fibers 18a and 18b, electric wiring or the like from entering the under side of the lock arm 5.

Figure 6A:
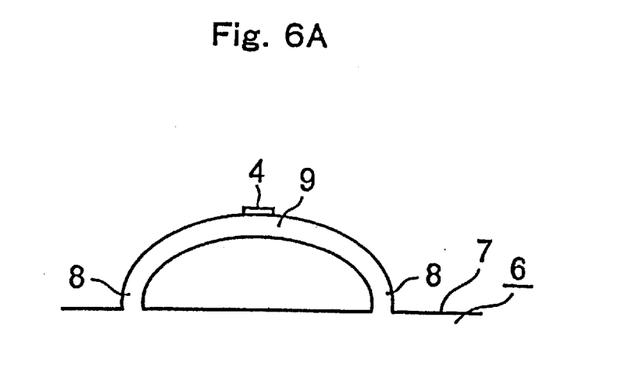
FIG. 6A depicts an illustration for a back side showing a bridge part and a peripheral configuration thereof in another embodiment of the optical connector in the invention.

In addition, in each of the embodiments, the bridge supporting parts 8 were configured to stand slantly upward from the upper face 7 of the plug housing 6 and the bridge part 9 was formed to be almost parallel to the upper face 7 of the plug housing 6. However, the optical connector 2 may have a configuration where the joining configuration of bridge supporting parts 8 to a bridge part 9 is formed into an arc shape, as shown in FIG. 6A.

Figure 6B:
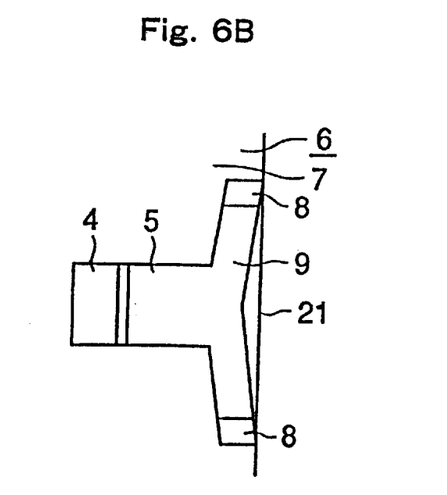
FIGS. 6B and 6C depict plan illustrations showing a bridge part and a peripheral configuration thereof in still another embodiment of the optical connector in the invention.
Figure 6C:
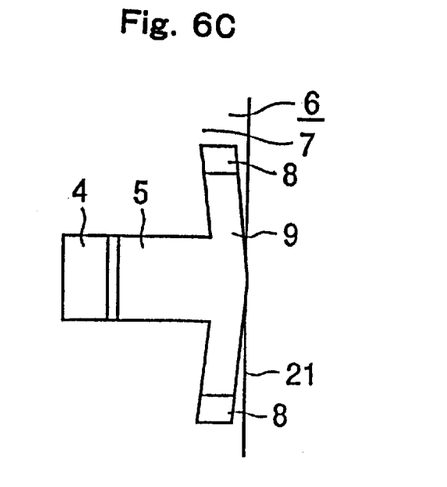

Furthermore, in each of the embodiments, the joining configuration of the bridge part 9 to the lock arm 5 was formed to be a T-shaped plan configuration. However, the optical connector 2 may have a plan configuration of the joining configuration of a bridge part 9 to a lock arm 5, as shown in FIGS. 6B and 6C.

Moreover, in the embodiments described above, the optical connector of the invention was described for use in optical communications inside a vehicle. However, the optical connector of the invention can be applied to the use in various optical communications such as an FA, a home LAN, an audio and a PC other than those described above.

Besides, in the embodiment described above, the plastic optical fiber was used as the optical fiber. However, a glass optical fiber may be used, types of optical fibers are not defined.

Industrial Applicability

As described above, the optical connector of the invention is suitable for connecting the optical fiber to the optical device with a low connection loss and space saving in various optical communications that include vehicles.

What is claimed is:

1. An optical connector comprising:

a housing;

a lock arm extended toward a front end side of the housing;

two bridge supporting parts, each standing from a respective side of an upper face of the housing and projecting in a direction that is substantially skewed with the direction of the lock arm;

a bridge part spaced from the upper face of the housing as supported at both sides thereof by the bridge supporting parts, wherein the lock arm is formed in a midway part of the bridge part; and a locking pawl extended upward at a position of a front end side of the lock arm for locking into a lock part of a connecting counter part side in inserting and fitting the optical connector to the connecting counter part side.

2. The optical connector according to claim 1, characterized in that the front end side of the lock arm is extended longer than a locking pawl forming part and the front end thereof is fixed to the upper face of the housing.

* * * * *